(12) United States Patent
Zhang et al.

(10) Patent No.: US 11,732,486 B2
(45) Date of Patent: Aug. 22, 2023

(54) PLASTIC FLOOR AND PRODUCTION APPARATUS AND PRODUCTION PROCESS OF THE SAME

(71) Applicant: Anhui Youshengmei New Material Technology Co., Ltd., Lu'an (CN)

(72) Inventors: Yi Zhang, Lu'an (CN); Qiang Zhang, Lu'an (CN)

(73) Assignee: Anhui Youshengmei New Material Technology Co., Ltd., Lu'an (CN)

( * ) Notice: Subject to any disclaimer, the term of this patent is extended or adjusted under 35 U.S.C. 154(b) by 131 days.

(21) Appl. No.: 16/894,911

(22) Filed: Jun. 8, 2020

(65) Prior Publication Data
US 2021/0310259 A1 Oct. 7, 2021

(30) Foreign Application Priority Data

Apr. 3, 2020 (CN) .......................... 202010365278.4
Apr. 14, 2020 (CN) .......................... 202010291959.0

(51) Int. Cl.
| | |
|---|---|
| *E04F 15/00* | (2006.01) |
| *E04F 15/10* | (2006.01) |
| *B32B 3/06* | (2006.01) |
| *B32B 27/08* | (2006.01) |
| *B32B 27/30* | (2006.01) |

(Continued)

(52) U.S. Cl.
CPC ............ *E04F 15/107* (2013.01); *B32B 3/06* (2013.01); *B32B 27/08* (2013.01); *B32B 27/30* (2013.01); *B32B 37/0053* (2013.01); *B32B 37/24* (2013.01); *B32B 38/0004* (2013.01); *E04F 15/105* (2013.01); *B32B 2037/243* (2013.01); *B32B 2307/402* (2013.01);

(Continued)

(58) Field of Classification Search
CPC .......... E04F 15/02033; E04F 15/02038; E04F 15/107; E04F 15/102; E04F 2201/042; E04F 2201/0107; E04F 2201/03; E04F 2201/0552; E04F 2201/023; E04F 2201/0535; E04F 2201/0146; E04F 2201/043; E04F 2201/0547; E04F 2201/0153; E04F 2201/0138; E04F 15/105; B32B 3/06; B32B 27/08; B32B 27/30; B32B 37/0053; B32B 37/24; B32B 38/004; B32B 2037/243; B32B 2307/402; B32B 2307/554; B32B 2307/71; B32B 2471/00
USPC .. 52/592.1, 592.3, 592.2, 578, 588.1, 309.1, 52/309.3
See application file for complete search history.

(56) References Cited

U.S. PATENT DOCUMENTS

2005/0144878 A1* 7/2005 Grafenauer ............. E04F 15/04
 52/578
2005/0235593 A1* 10/2005 Hecht ..................... B44C 5/043
 52/592.1

(Continued)

*Primary Examiner* — Chi Q Nguyen (57) ABSTRACT

At least on or near one of its edges a plastic floor includes a chamfer formed during a rolling press and plate press forming process. During the rolling press and plate press forming process of the plastic floor, a chamfer is formed at the periphery on the front surface of the plastic floor. The wear-resistant layer and color film layer at the chamfer are not damaged. When splicing, the chamfers on the two pieces of plastic floor are connected to each other to form a joint seam, and there is no need to cut chamfers at the edge of the floor before grooving, thereby reducing the production process, and improving the appearance of the joint seam.

4 Claims, 6 Drawing Sheets

(51) Int. Cl.
  *B32B 37/00* (2006.01)
  *B32B 37/24* (2006.01)
  *B32B 38/00* (2006.01)
  *E04F 15/02* (2006.01)

(52) U.S. Cl.
  CPC ..... *B32B 2307/554* (2013.01); *B32B 2307/71* (2013.01); *B32B 2471/00* (2013.01); *E04F 15/02038* (2013.01)

(56) References Cited

U.S. PATENT DOCUMENTS

| | | | |
|---|---|---|---|
| 2010/0018149 A1* | 1/2010 | Thiers | E04F 15/02033 52/588.1 |
| 2011/0146188 A1* | 6/2011 | Wallin | E04F 15/02033 29/897.32 |
| 2012/0240502 A1* | 9/2012 | Wilson | E04F 15/14 52/416 |
| 2017/0030088 A1* | 2/2017 | Simoens | B21D 47/00 |
| 2017/0144409 A1* | 5/2017 | Ting | E04F 15/105 |
| 2017/0204619 A1* | 7/2017 | Rose | B32B 3/30 |
| 2019/0271164 A1* | 9/2019 | Devos | E04F 15/02038 |
| 2020/0131784 A1* | 4/2020 | Boucké | E04F 13/18 |
| 2021/0206143 A1* | 7/2021 | Ting | B32B 27/308 |
| 2021/0310259 A1* | 10/2021 | Zhang | B32B 3/30 |
| 2021/0363759 A1* | 11/2021 | Baert | E04F 15/02033 |
| 2022/0371302 A1* | 11/2022 | Saito | B32B 15/18 |

* cited by examiner

PLASTIC FLOOR AND PRODUCTION APPARATUS AND PRODUCTION PROCESS OF THE SAME

CROSS REFERENCE TO RELATED APPLICATION

The present application is related to and claims the benefit of priority to Chinese Patent Application No. 2020102919590, entitled "Plastic Floor and Production Apparatus and Production Process of the same", filed with SIPO on Apr. 14, 2020, and Chinese Patent Application No. 2020103652784, entitled "Plastic Floor and Production Apparatus and Production Process of the same", filed with SIPO on Apr. 30, 2020, the contents of which are incorporated herein by reference in their entireties.

BACKGROUND

Field of Disclosure

The present disclosure relates to the technical field of SPC (stone plastic composite) floor manufacturing, in particular, to a plastic floor and a production apparatus and a production process of the same.

Description of Related Arts

It is a trend of the development of plastic floor products today to use plastic materials to make floors instead of using natural wood, thereby reducing the damage to natural resources. SPC floors are generally divided into four layers from top to bottom, as shown in FIGS. 1a-2b. The first layer is a transparent UV layer 101, the second layer is a wear-resistant layer 102, the third layer is a color film layer 103 with a texture pattern, and the fourth layer is an SPC core layer 104. The current production process of the SPC floor is as follows:

A. The extrusion apparatus extrudes an SPC core layer with a certain width and thickness.

B. The SPC core layer passes between the first roll and the second roll to determine the thickness.

C. The SPC core layer with a fixed thickness passes between the third roll and the fourth roll, and at the same time, the wear-resistant layer film and the color film are disposed to the surface of the SPC core layer from top to bottom to form a whole sheet.

D. The sheet formed in operation C is cut into a first semi-finished product of a specified size with a guillotine knife.

E. A transparent UV layer is formed on the surface of the first semi-finished product through the UV coating line to form the second semi-finished product.

F. The second semi-finished product is cut into multiple third semi-finished products with same width through the multi-blade sawing device.

G. The third semi-finished product is processed twice by the grooving device, the edge of the semi-finished product 3 is cut first to form a chamfer, and then the third semi-finished product is grooved.

Through the above operation G, the edge of the plastic floor is cut to form a chamfer, which solves the following problem: if the chamfering process is not performed, when the heights of the adjacent plastic floors are inconsistent during the laying process, after the two right angle edges of the adjacent plastic floors approach, a step will be formed, which affects the appearance. Therefore, the edge of the plastic floor needs to be cut to form a chamfer.

Figure 1A:
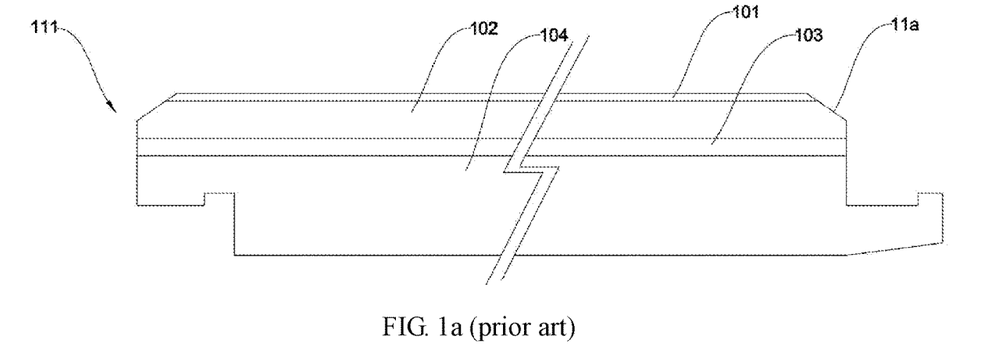
FIGS. 1a-1b show a plastic floor according to an embodiment in the prior art.
Figure 1B:
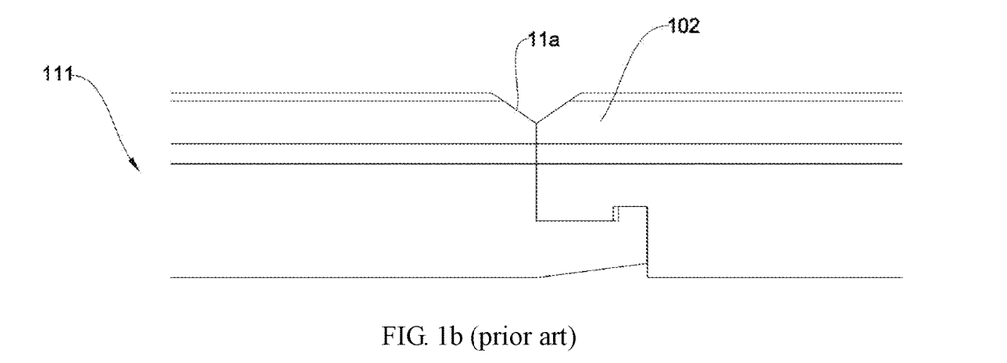

The current chamfer is generally formed by the following processing methods:

1) On the grooving device, as shown in FIGS. 1a-1b, the edge of the plastic floor 111 is cut to form a micro chamfer 11a. The angle and depth of the micro chamfer 11a are adjusted by using the thickness of the wear layer of the plastic floor 111. Only the UV layer 101 and the wear-resistant layer 102 of the plastic floor 111 are cut. The advantage is that the process is simple and it is easy to produce. The disadvantage is that the size of the chamfer 11a is limited by the thickness of the wear-resistant layer 102, and the visual effect is not good.

Figure 2A:
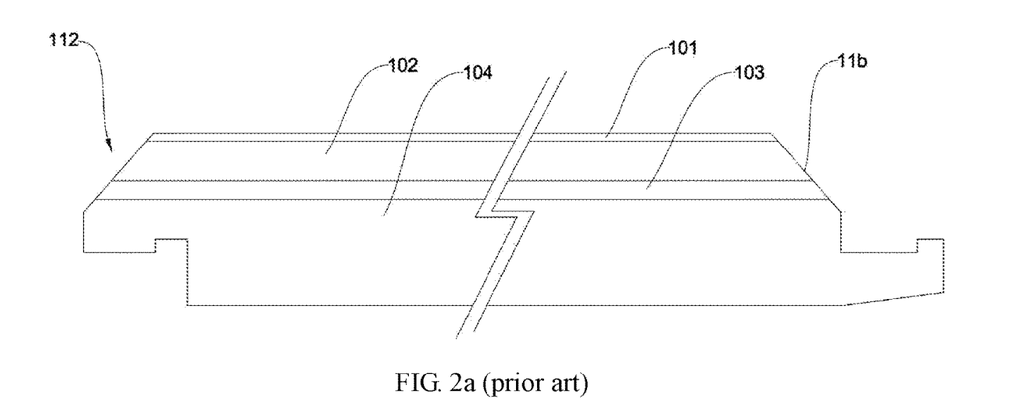
FIGS. 2a-2b show a plastic floor according to another embodiment in the prior art.
Figure 2B:
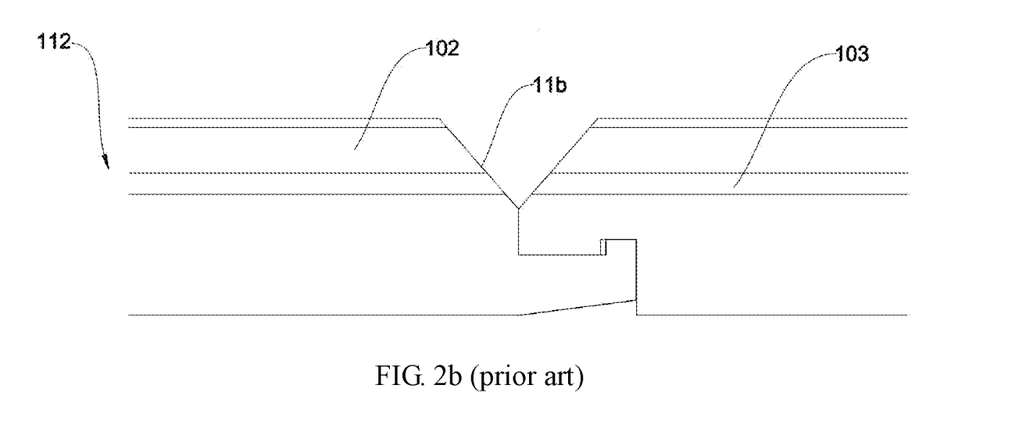

2) On the grooving device, as shown in FIGS. 2a-2b, the edge of the plastic floor 112 is cut to form a micro chamfer 11b. Regardless of the thickness of the wear-resistant layer 102, the size and angle of the chamfer 11b can be freely adjusted. But the beveled surfaces of the chamfer need to be treated with paint later. As shown in FIG. 2a, the grooving device cuts the UV layer 101, the wear-resistant layer 102, the color film layer 103, and the SPC core layer 104. The advantage is that the size and angle of the chamfer 11b can be adjusted freely, which can clearly separate the seams between the plastic floors 112. The disadvantages are that the production process is complicated and the production process is increased. A part of the color film layer 103 is cut away to expose the color of the SPC core layer 104. Therefore, a layer of colored paint needs to be applied on the beveled surface, which is easy to cause the problem that the paint color and floor color are inconsistent, as well as the problem that the paint on the beveled surface would spill onto the front surface of the floor.

SUMMARY OF THE PRESENT DISCLOSURE

The present disclosure provides a plastic floor, and a production apparatus and a production process of the plastic floor, to solve the problem that the treatment of the plastic floor edge in the prior art is complicated.

The present disclosure provides a plastic floor, at least on or near one of its edges the plastic floor includes a chamfer formed during a rolling press and plate press forming process.

Preferably, the plastic floor includes a UV layer, a wear-resistant layer, a color film layer and an SPC core layer from top to bottom in a thickness direction.

The present disclosure further provides a production process for producing the above plastic floor having a chamfer on or near one of its edges. The production process includes:

1) Forming a first sheet by pressing a SPC core layer into an even thickness.

2) Forming a second sheet above the first sheet by simultaneously or sequentially disposing firms and chamfering. The disposing of the films includes: disposing a color film and a wear-resistant layer film on the first sheet, the color film is located between the wear-resistant layer film and the SPC core layer. The chamfering includes: using a pressing roll with a protruding chamfered edge, to press on a side of the wear-resistant layer film, allowing the chamfered edge to deform the wear-resistant layer film, the color film and the core layer at a corresponding part of the second sheet to form the chamfer on the plastic floor.

Preferably, in the operation 2), the pressing roll includes a protruding dividing edge, the dividing edge divides the second sheet into individual plastic floor sheets while pressing on the wear-resistant layer film.

Preferably, the method further includes: 3) cutting the second sheet formed in the operation 2) to form individual plastic floor sheets.

Preferably, the method further includes: forming a UV layer on the wear-resistant layer film of the plastic floor sheet through UV coating; forming the plastic floor by grooving the SPC core layer of the plastic floor sheet.

The present disclosure further provides a production apparatus for producing the above plastic floor having a chamfer on or near one of its edges. The production apparatus includes a pressing roll, a roll surface of the pressing roll includes at least one rolling area along an axial direction, the rolling area is surrounded by a protruding chamfered edge, and the chamfered edge is contiguous with the roll surface of the rolling area to form a chamfered portion.

Preferably, the production apparatus further includes: a fixed-thickness roll assembly including a first roll and a second roll opposite to the first roll; a third roll and a fourth roll arranged side by side and placed downstream of the fixed-thickness roll assembly; a wear-resistant layer film conveying assembly, which conveys the wear-resistant layer film to the area between the third roll and the fourth roll; a color film conveying assembly, which conveys the color film to the area between the third roll and the fourth roll; and a formation roll assembly placed downstream of the fourth roll, including a fifth roll acting as the pressing roll and a sixth roll opposite to the fifth roll.

Preferably, the production apparatus further includes: a fixed-thickness roll assembly including a first roll and a second roll opposite to the first roll; a third roll acting as the pressing roll and a fourth roll arranged side by side and placed downstream of the fixed-thickness roll assembly; a wear-resistant layer film conveying assembly, which is close to a side of the third roll and conveys the wear-resistant layer film to the area between the third roll and the fourth roll; and a color film conveying assembly, which conveys the color film to the area between the third roll and the fourth roll.

Preferably, a roll surface corresponding to the rolling area contains embossing.

Preferably, on a roll surface of the pressing roll, a cutting edge protruding from the roll surface is further disposed on a periphery of each rolling area, and the cutting edge is located outside the chamfered edge.

The present disclosure further provides a production process for producing the above plastic floor. The production process includes: 1). preparing an SPC core layer with a predetermined thickness; 2). sequentially disposing a core layer, a color film, and a wear-resistant layer on a tray of a press assembly, and covering with an embossing plate, an embossed surface of the embossing plate contains a protruding chamfered edge to form the chamfer; 3). forming a chamfered plaster floor sheet by sending the tray after the disposing in the operation 2) to the press assembly, and processing by using a plate pressing production process, the plate pressing production process includes: high temperature treatment, high pressure treatment, cooling, pressure relief, removing the tray, and removing the embossing plate and taking out the sheet; and 4). performing the following operations on the plastic floor sheet to form the plastic floor: UV coating, sawing, and grooving.

As mentioned above, the plastic floor, and the production apparatus and production process of the plastic floor of the present disclosure have the following beneficial effects: during the rolling press and plate press forming process of the plastic floor of the present disclosure, a chamfer is formed at the periphery on the front surface of the plastic floor. The chamfer can be formed by deformation of the wear-resistant layer, color film layer and SPC core layer. When splicing, the chamfers on the two pieces of plastic floor are connected to each other to form a joint, which directly forms a joint seam, and there is no need to cut and chamfer the edge of the floor before grooving, thereby reducing the production process without damaging the wear-resistant layer, improving the appearance of the joint seam, and achieving the effect of simulating the wood floor. This chamfer can be formed by rolling or molding.

DESCRIPTION OF REFERENCE NUMERALS

101 UV layer
102 Wear-resistant layer
103 Color film layer
104 SPC Core layer
200 SPC Core layer
2 Second roll
3 First roll
4 Third roll
5 Color film conveying assembly
6 Fourth roll
7 Lifting mechanism
8 Fifth roll
9 Sixth roll
81 Rolling area
82 Chamfered edge
83 Chamfered portion
84 Cutting edge
85 Cutting edge
10 Rack
11a, 11b, 11c Chamfer
12 Moving mechanism
13 Embossing plate
131 Chamfered edge 132 Molding area
133 Chamfered portion
14 Fourth roll
15 First roll
16 Third roll
17 Second roll

DETAILED DESCRIPTION OF THE PREFERRED EMBODIMENTS

The embodiments of the present disclosure will be described below. Those skilled may easily understand other advantages and effects of the present disclosure according to contents disclosed by the specification.

Referring to FIGS. 1 to 12. It should be understood that the structures, proportions, sizes, and the like, which are illustrated in the drawings of the present specification, are only used to clarify the contents disclosed in the specification for understanding and reading by those skilled, and are not intended to limit the implementation of the present disclosure, thus are not technically meaningful. Any modification of the structure, change of the scale, or adjustment of the size should still fall within the scope of the technical contents disclosed by the present disclosure without affecting the effects and achievable objectives of the present disclosure. In the meantime, the terms "upper", "lower", "left", "right", "intermediate" and "one" as used in this specification are also for convenience of description, and are not intended to limit the scope of the present disclosure, and the change or adjustment of the relative relationship is considered to be within the scope of the present disclosure without substantial changes in technology.

Figure 3:
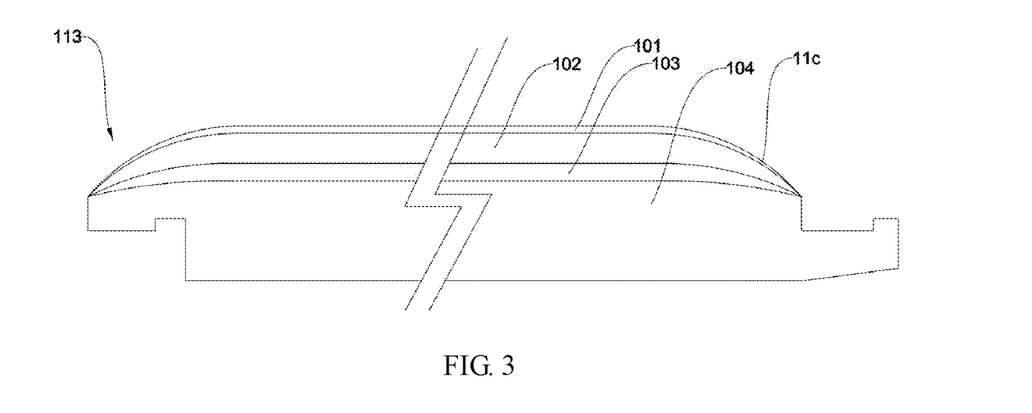
FIG. 3 shows a cross-sectional view of a plastic floor according to the present disclosure.
Figure 4:
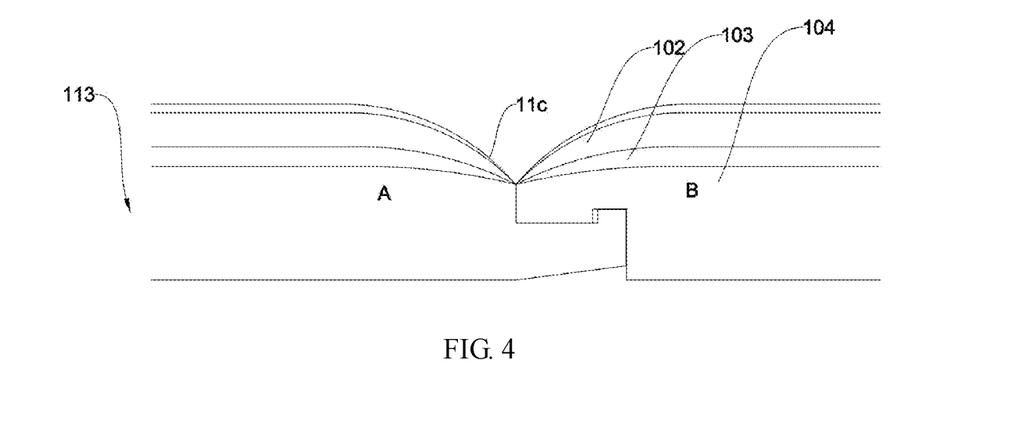
FIG. 4 shows a schematic view of two pieces of plastic floor spliced together according to an embodiment of the present disclosure.

As shown in FIG. 3, this embodiment provides a plastic floor 113. At least on or near one of its edges the plastic floor 113 includes a chamfer 11c, which is formed during the rolling press and plate press forming process. The plastic floor 113 is divided into a UV layer 101, a wear-resistant layer 102, a color film layer 103 and an SPC core layer 104 in the thickness direction.

For ease of description, in this specification, the surface of the UV layer 101 is defined as the front surface of the plastic floor 113, and the surface of the SPC core layer 104 is defined as the back surface of the plastic floor 113. During rolling press and plate press forming, by applying chamfering pressure to the front surface of the plastic floor 113, the wear-resistant layer 102, the color film layer 103, and the SPC core layer 104 are deformed to the same extent to form the chamfer 11c. Then a UV layer 101 is formed through UV coating. It can be seen that the wear-resistant layer 102 and the color film layer 103 at the chamfer are not damaged. When two pieces of plastic floor 113 are spliced, referring to the plastic floor A and plastic floor B in FIG. 4, the chamfers 11c on the two pieces of plastic floor are connected to each other to form a seam. The textures of the plastic floors at the seam are connected without being damaged, which improves the appearance.

In this embodiment, the chamfer 11c is formed directly during the rolling press and plate press forming of the plastic floor 113. In this embodiment, the cross-sectional shape of the chamfer 11c may be an arc, a bevel, or a zigzag. The above wear-resistant layer 101 and the color film 102 both extend to the chamfer 11, and there is no need to perform chamfer cutting on the edge of the floor before grooving. This embodiment saves the production process and ensures that the wear-resistant layer and color film at the chamfer are not damaged, thereby improving the appearance of use.

Embodiment 1

Figure 9:
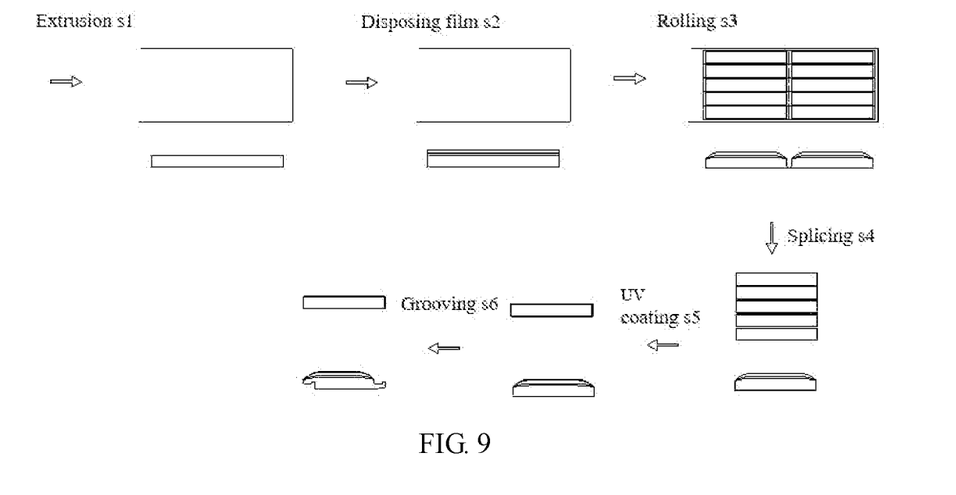
FIG. 9 shows a schematic view of a production process of the plastic floor.

The present embodiment provides a production process for producing the above plastic floor, which can be achieved by the rolling mechanism shown in FIGS. 5 to 9. The production process includes the following operations:

1) An extrusion apparatus in a core layer production line extrudes an SPC core layer with a certain width and thickness, the SPC core layer 200 is transported to a thickness determination area, that is, the SPC core layer is set a thickness between the first roll 3 and the second roll 2 to form a first sheet, which is shown as extrusion in the operation s1 in FIG. 9.

2) The first sheet passes between the third roll 4 and the fourth roll 6, and at the same time, the wear-resistant layer film and the color film are disposed to the surface of the SPC core layer 200 from top to bottom to form a whole second sheet, which is shown as disposing film in the operation s2 in FIG. 9.

Figure 7:
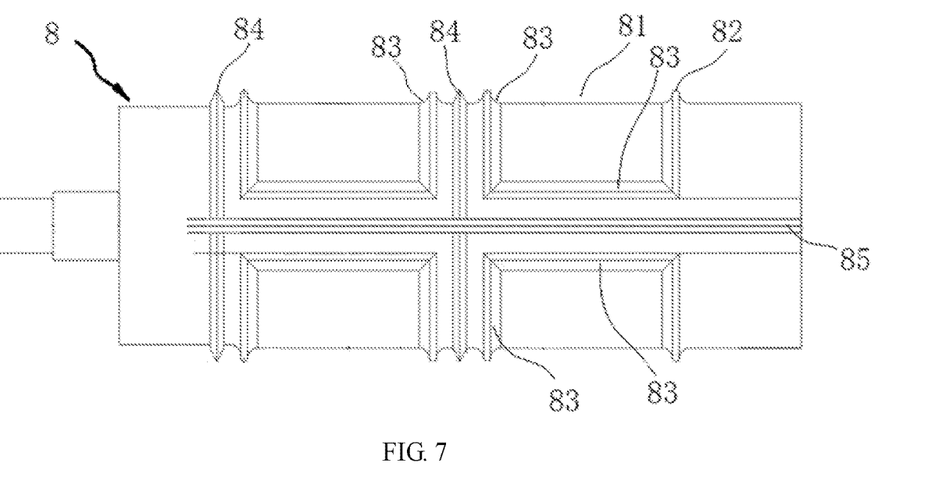
FIG. 7 shows a schematic view of a partial roll surface of the pressing roll.

3) The second sheet is transported to a formation rolling section, and the formation rolling section includes a pressing roll. In this embodiment, the pressing roll is the fifth roll 8, as shown in FIG. 7, the pressing roll includes a protruding chamfered edge 82 and a cutting edge 84. The pressing roll is pressed on a side of the wear-resistant layer film of the second sheet, and the chamfered edge 82 deforms a corresponding part of the second sheet to form the chamfer 11c on the plastic floor. At the same time, the cutting edge 84 divides the second sheet into individual plastic floor sheets, that is, the rolling in the operation s3 and the splicing in the operation s4 in FIG. 9 are completed simultaneously.

4) A UV layer is formed on the wear-resistant layer film of the plastic floor sheet through UV coating, that is, the UV coating in the operation s5 in FIG. 9. The UV layer is used to change the gloss and improve the wear resistance of the plastic floor.

5) The SPC core layer 200 of the plastic floor sheet is grooved to form a locking groove for laying, that is, the grooving in the operation s6 in FIG. 9. Finally the plastic floor is formed.

In this embodiment, the chamfer 11c is formed through rolling in the operation 3). The entire process is easy to realize and the production efficiency is improved. It only needs to design the surface of the roll used for rolling. The chamfered edge 83 is designed on the roll surface. The chamfer 11c is formed at the periphery of the plastic floor by using four chamfered edges 83.

In this embodiment, the surface of the plastic floor may be smooth or textured, and the texture may be formed at the same time as disposing the film in the operation s2, or may be formed later.

Embodiment 2

The present embodiment provides a production process for producing the above plastic floor. As shown in FIG. 9, the production process at least includes:

1) An extrusion apparatus in a core layer production line extrudes an SPC core layer with a certain width and thickness, i.e. operation s1, the SPC core layer 200 is transported to a thickness determination area, the SPC core layer is set a thickness in the thickness determination area to form a first sheet.

2) The first sheet is transported to the area where the color film and the wear-resistant layer are laid, and the color film and the wear-resistant layer film are laid on the surface of the first sheet from bottom to top, that is, the second sheet is formed in the operation s2.

3) The second sheet is transported to a formation rolling section, the formation rolling section includes a pressing roll, the pressing roll contains a protruding chamfered edge, the pressing roll is pressed on a side of the wear-resistant layer film of the second sheet, and the chamfered edge deforms a corresponding part of the second sheet, that is, forming the chamfer on the plastic floor in the operation s3.

4) The sheet formed in the operation 3) is cut, that is, individual plastic floor sheets are formed in the operation s4.

5) A UV layer is formed on the wear-resistant layer film of the plastic floor sheet through UV coating, that is, the operation s5. The UV layer is used to improve the gloss and wear resistance of the plastic floor.

6) The SPC core layer of the plastic floor sheet is grooved to form a locking groove for laying, that is, the operation s6. Finally the plastic floor is formed.

Embodiment 3

Figure 5:
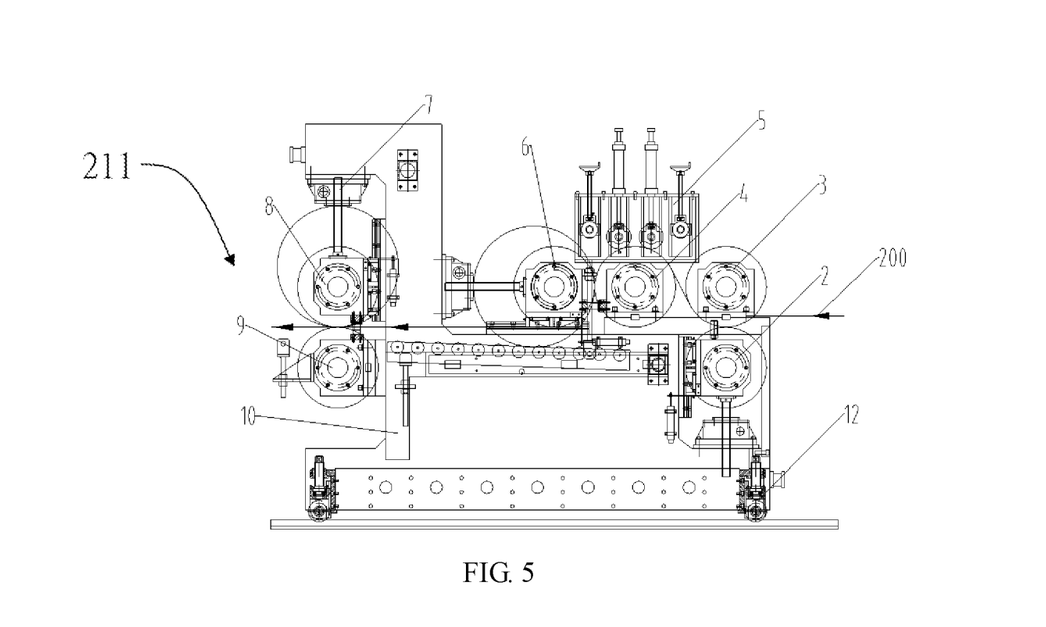
FIG. 5 shows a schematic view of a rolling mechanism in a production apparatus of the plastic floor according to Embodiment 1 of the present disclosure.
Figure 6:
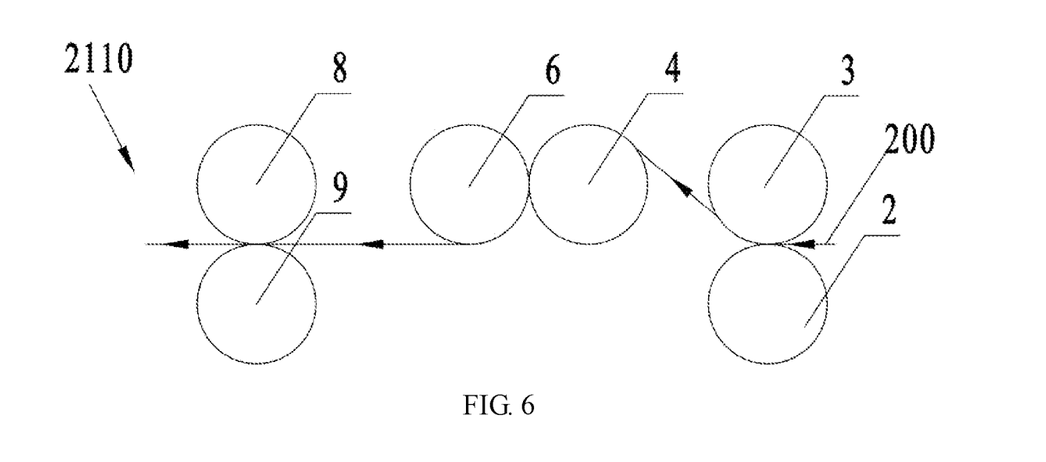
FIG. 6 shows a view of the rolling process of the rolling mechanism in FIG. 5.

This embodiment provides a production apparatus for producing the plastic floor as described above, which can realize the production process in the above Embodiment 1 and Embodiment 2. In this embodiment, the apparatus may include a core layer production line, a rolling mechanism, and a packaging mechanism connected in sequence. According to production needs, the core layer production line and packaging mechanism can be selectively installed and used. To achieve the above-mentioned plastic floor with a chamfer 11c, the core of this embodiment is the rolling mechanism. Referring to FIGS. 5 to 7, a first rolling mechanism 211 includes a fixed-thickness roll assembly, a third roll 4 and a fourth roll 6, a wear-resistant layer film conveying assembly, a color film conveying assembly 5, and a formation roll assembly.

The fixed-thickness roll assembly includes a first roll 3 and a second roll 2 opposite to the first roll 3.

The third roll 4 and the fourth roll 6 are arranged side by side and placed downstream of the fixed-thickness roll assembly. The wear-resistant layer film conveying assembly conveys the wear-resistant layer film to the area between the third roll 4 and the fourth roll 6. The color film conveying assembly 5 conveys the color film to the area between the third roll 4 and the fourth roll 6. The surface of the fourth roll 6 is textured, which gives an uneven texture to the front surface of the plastic floor. The surface of the third roll 4 has texture, which gives a bottom texture to the back surface of the plastic floor.

The formation roll assembly is placed downstream of the fourth roll 6, which includes a fifth roll 8 and a sixth roll 9 opposite to the fifth roll 8. As shown in FIGS. 5 and 6, in this embodiment, the fifth roll 8 is above the sixth roll 9, and the fifth roll 8 uses the pressing roll in FIG. 7. That is, the roll surface of the fifth roll 8 includes at least one rolling area 81 along an axial direction. The rolling area 81 is surrounded by a protruding chamfered edge 82, and the chamfered edge 82 is contiguous with the roll surface of the rolling area 81 to form a chamfered portion 83. The chamfered portion 83 is used to form the above chamfer 11c. In this embodiment, the rolling area 81 can be used to form the front embossing of the plastic floor. The axial width of the rolling area 81 matches the width of the plastic floor A/B, and the length of the rolling area 81 in the circumferential direction matches the surface length of the plastic floor A/B.

In this embodiment, the above-mentioned plastic floor with a chamfer 11c can be produced, and the entire pressing of the plastic floor is completed in the rolling production mechanism. By designing the roll surface of the fifth roll 8, it will have a chamfered edge 82 with a chamfered portion 83. The peripheral edge of the plastic floor is deformed by using the chamfered portion 83. The second to fourth layers (that is, the wear-resistant layer 102, the color film layer 103 and the SPC core layer 104) of the plastic floor from top to bottom deform to the same extent, to form the chamfer 11c, thereby ensuring that the wear-resistant layer 102 and the color film are not damaged, which is convenient for subsequent laying.

More preferably, as shown in FIG. 7, on the roll surface of the fifth roll 8, protruding cutting edges 84, 85 are located outside the chamfered edge 82 corresponding to each rolling area 81 (in this specification, the rolling area 81 is surrounded by the chamfered edge 82, the rolling area 81 is inside the chamfered edge 82, and the outside of the chamfered edge 82 is the side opposite to the inside), and have a certain distance from the chamfered edge 82. The cutting edges 84, 85 can cut the plastic floor sheet into small pieces according to size while forming the chamfer 11c in the above operation s3.

In this embodiment, the cutting edge 85 is an elongated edge extending in the axial direction and protruding from the surface of the roll, and the elongated edge divides the roll surface of the fifth roll 8 in the circumferential direction. In this embodiment, the plastic floor sheet is directly cut into the plastic floor through cutting edges 84, 85 without the need for subsequent cutting with a cutting tool. It can realize the production process of the above-mentioned Embodiment 1 and improve the production efficiency. In this embodiment, the chamfered portion 83 may have an arc shape, a straight line shape, a stepped shape, or a zigzag shape, so as to form different chamfers 11c.

During production, a roll assembly 2110 of the first rolling mechanism 211 is shown in FIG. 6, the SPC core layer 200 enters between the first roll 3 and the second roll 2 to form the first sheet with a determined thickness. The first sheet goes upward and passes around the upper half of the surface of the third roll 4, then goes downward between the third roll 4 and the fourth roll 6 and passes through the lower half of the surface of the fourth roll 6. The wear-resistant layer film and the color film are transported between the roll 4 and the fourth roll 6 at the same time. The wear-resistant layer film and the color film are pressed on the first sheet from top to bottom, to form the second sheet. The surface of the second sheet is smooth, or is textured while being coated as needed. The second sheet is horizontally conveyed between the fifth roll 8 and the sixth roll 9, and the plastic floor sheet with the chamfer 11 is formed by the pressing of the fifth roll 8 and the sixth roll 9.

In this embodiment, the first rolling mechanism 211 further includes a rack 10 for installing the rolls. The rack 10 includes a moving mechanism 12 that can move the rack. The moving mechanism may include a driving mechanism and a wheel connected to the driving mechanism, which is convenient for moving the first rolling mechanism 211 to a desired position. In addition, to facilitate rolling, a gap adjustment component may be placed between the first roll 3 and the second roll 2, and between the third roll 4 and the fourth roll 6, to adjust the gap between two rolls. The fifth roll 8 is connected with the lifting mechanism 7, to adjust the opening and closing between the fifth roll 8 and the sixth roll 9.

Figure 8:
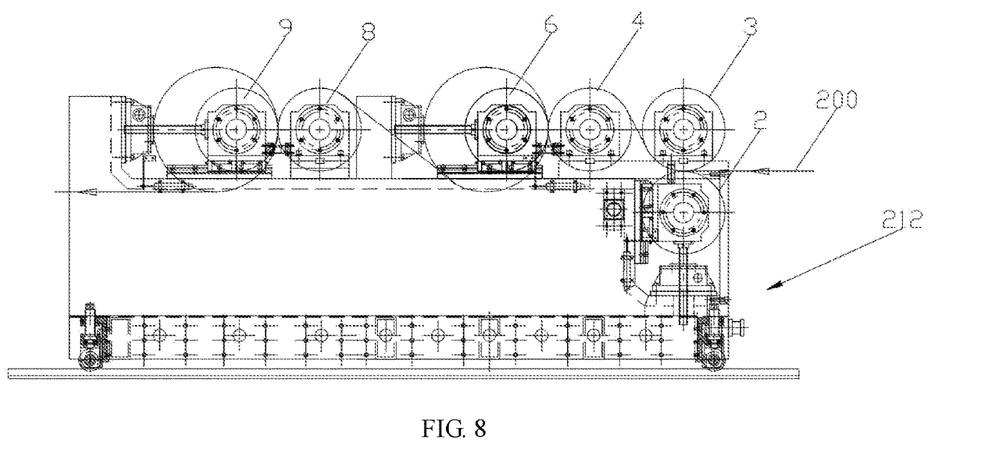
FIG. 8 shows a schematic view of a rolling mechanism in the production apparatus according to Embodiment 2 of the present disclosure.

FIG. 8 shows another embodiment of the rolling mechanism, which is a second rolling mechanism 212, this embodiment is basically the same as the above embodiment, except that the fifth roll 8 and the sixth roll 9 in the above-mentioned formation roll assembly are arranged oppositely in the horizontal direction. The fifth roll 8 on the left serves as the pressing roll and has the structure shown in FIG. 7.

The number of rolls of the rolling mechanism in this embodiment is not limited to this. It only needs to include the above-mentioned rolling mechanism to realize the pressing of the chamfer 11c. The number of rolls may be greater than 6 rolls. For example, other rolls are added between the fixed-thickness roll assembly and the coating roll assembly (that is, the third roll 4 and fourth roll 6), or between the coating roll assembly and the formation roll assembly, so as to make the plastic floor more beautiful.

The above-mentioned core layer production mechanism in this embodiment may include a screw machine that outputs SPC core layers. The die head of the screw machine extends between the first roll 2 and the second roll 3. The screw machine is used as the extrusion apparatus to extrude the SPC core layer to the area between the first roll 2 and the second roll 3.

Embodiment 4

The present disclosure further provides another embodiment of the production process for producing the plastic floor as described above. This embodiment may be implemented by using the rolling mechanism shown in FIG. 10. A third rolling mechanism 213 includes a fixed-thickness roll assembly, a third roll 16 and a fourth roll 14, a wear-resistant layer film conveying assembly, and a color film conveying assembly 5.

Figure 10:
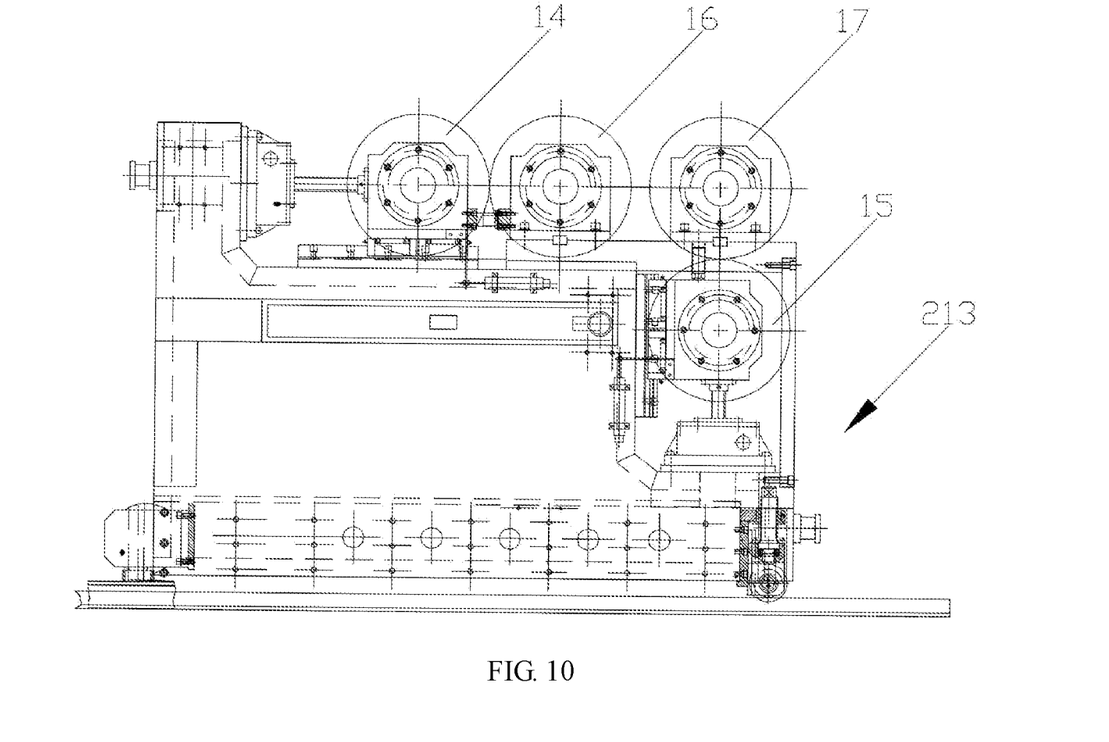
FIG. 10 shows a schematic view of a rolling mechanism in a production apparatus of the plastic floor according to Embodiment 3 of the present disclosure.

The fixed-thickness roll assembly includes a first roll 15 and a second roll 17 opposite to the first roll 15.

The third roll 16 and the fourth roll 14 are arranged side by side and placed downstream of the fixed-thickness roll assembly. The wear-resistant layer film conveying assembly conveys the wear-resistant layer film to the area between the third roll 16 and the fourth roll 14. The color film conveying assembly 5 conveys the color film to the area between the third roll 16 and the fourth roll 14. The fourth roll 14 on one hand gives an uneven texture to the front surface of the plastic floor, on the other hand it is used to form the chamfer 11c. That is, the fourth roll 14 in this embodiment serves as a pressing roll, which is located on the side of the wear-resistant layer film, and has the structure shown in FIG. 7. Specifically, the roll surface of the fourth roll 14 has at least one rolling area 81 along the axial direction. The rolling area 81 is surrounded by protruding chamfered edges 82. The roll surface of the rolling area 81 in this embodiment may have a texture or a smooth surface. Whether there is texture depends on requirements. The surface of the third roll 16 has texture, which gives a bottom texture to the back surface of the plastic floor.

More preferably, on each rolling area 81 of the fourth roll 14 of this embodiment, protruding cutting edges 84, 85 are located outside the chamfered edge 82 corresponding to each rolling area 81 (in this specification, the rolling area 81 is surrounded by the chamfered edge 82, the rolling area 81 is inside the chamfered edge 82, and the outside of the chamfered edge 82 is the side opposite to the inside), and have a certain distance from the chamfered edge 82. The cutting edges 84, 85 can cut the plastic floor sheet into small pieces according to size while forming the embossing and chamfer 11c in the above operation 2).

The production process of this embodiment can be realized by the third rolling mechanism 213 composed of the above four rolls, and specifically includes the following operations:

1) An extrusion apparatus in a core layer production line extrudes an SPC core layer with a certain width and thickness, the SPC core layer is transported to a thickness determination area, that is, the SPC core layer is set a thickness between the first roll 18 and the second roll 17 to form a first sheet.

2) Forming a second sheet by disposing films and chamfering between the third roll 16 and the fourth roll 14 simultaneously. The disposing of the films includes: disposing a color film and a wear-resistant layer film on the first sheet, the color film is located between the wear-resistant layer film and the SPC core layer. The chamfering includes: using a pressing roll (i.e. the fourth roll 14) with a protruding chamfered edge 82, the pressing roll is pressed on a side of the wear-resistant layer film, and the chamfered edge 82 deforms the wear-resistant layer film, the color film and the core layer at a corresponding part of the second sheet to form the chamfer on the plastic floor.

In this embodiment, the above-mentioned plastic floor is produced by a four-roll mechanism, which uses the pressing roll having the structure shown in FIG. 7 as the fourth roll 8. At the same time, rolling area surface of the fourth roll 8 contains embossing. Therefore, the disposing of films and chamfering are achieved at the same time, which improves the production efficiency and simplifies the production apparatus.

In addition, in order to facilitate the cutting of the second sheet to form individual plastic floors, in this embodiment, the cutting can be completed in the operation 2). For example, the pressing roll, i.e. the fourth roll 14 contains a cutting edge. The cutting and slicing can also be realized in the next process.

The production process of this embodiment further includes the follow-up: coating the wear-resistant layer film to form a UV layer; the UV layer is used to improve the gloss and wear resistance of the plastic floor. The SPC core layer of the plastic floor sheet is grooved to form a locking groove for laying. Finally the plastic floor is formed.

Embodiment 5

Figure 11:
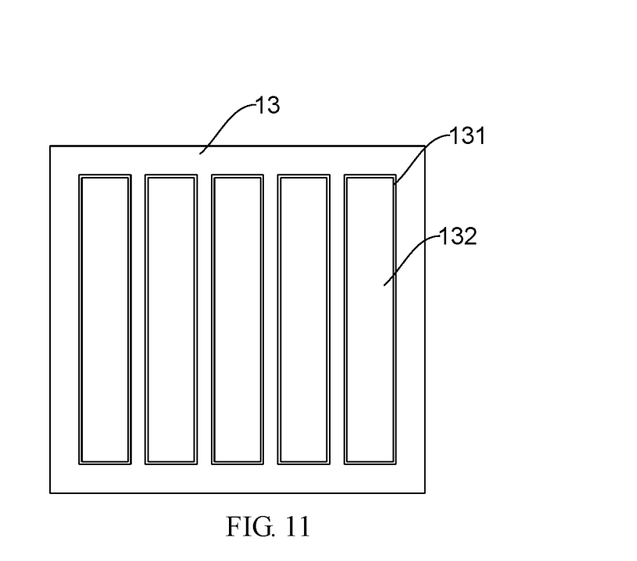
FIG. 11 shows a schematic view of an embossing plate.
Figure 12:
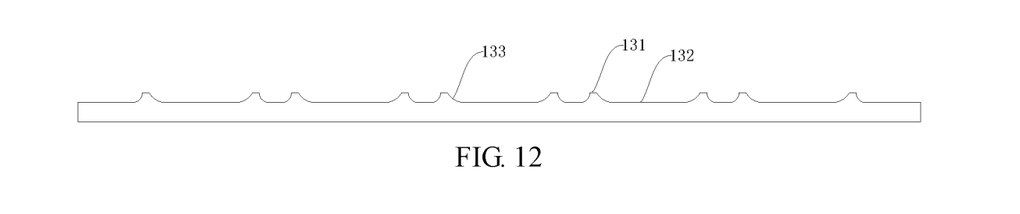
FIG. 12 shows a cross-sectional view of the embossing plate.

The present disclosure further provides another embodiment of the production process for producing the plastic floor as described above. Before production, the embossing plate 13 is prefabricated. As shown in FIGS. 11 and 12, the molding surface of the embossing plate 13 of this embodiment has a plurality of molding areas 132. Each molding area 132 is surrounded by protruding chamfered edges 131, and each molding area 132 corresponds to a piece of plastic floor, to form patterns on the plastic floor. In this embodiment, the width of the molding area 132 matches the width of the surface of the plastic floor, and the length of the molding area 132 matches the length of the surface of the plastic floor. This embodiment utilizes the side of the chamfered edge 131 close to the molding area (referring to the chamfered portion 133 of the chamfered edge in FIG. 12) to form the above-mentioned chamfer 11c. The inner shape of the chamfered edge 131 may be an arc shape, a straight line shape, a stepped shape, or a zigzag shape, to form a chamfer 11c with different shapes.

This embodiment specifically includes the following operations:

1) Producing an SPC core layer of the required standard thickness through a core layer production line.

2) Sequentially disposing a core layer, a color film, and a wear-resistant layer film on a tray of a press assembly, and covering with an embossing plate 13.

3) Forming a plastic floor sheet with a chamfer 11c by sending the tray after the disposing in the operation 2) to the press assembly, and processing by using a rolling press and plate pressing production process, the rolling press and plate pressing production process includes: high temperature treatment, high pressure treatment, cooling, pressure relief, removing the tray, and removing the embossing plate and taking out the sheet.

4) Keeping for 24 hours after finished plate press process in the operation 3), and performing the following process: UV coating; sawing from the chamfer surrounded by adjacent chamfered edges 131 to form an individual plastic floor; grooving to form locking grooves on both sides of the plastic floor; packaging.

Therefore, the present disclosure effectively overcomes various shortcomings in the existing technology and has high industrial utilization value.

The above-mentioned embodiments are just used for exemplarily describing the principle and effects of the present disclosure instead of limiting the present disclosure. Those skilled in the art can make modifications or changes to the above-mentioned embodiments without going against the spirit and the range of the present disclosure. Therefore, all equivalent modifications or changes made by those who have common knowledge in the art without departing from the spirit and technical concept disclosed by the present disclosure shall be still covered by the claims of the present disclosure.

We claim:

1. A production process for producing a plastic floor having a chamfer on or near one of edges of said plastic floor, and the production process comprising the following operations:

1) Forming a first sheet by pressing a stone plastic composite (SPC) core layer into an even thickness
   2) Forming a second sheet above the first sheet by simultaneously or sequentially disposing firms and chamfering
   said disposing of the films comprises: disposing a color film and a wear-resistant layer film on the first sheet, the color film is located between the wear-resistant layer film and the SPC core layer, and
   said chamfering comprises: using a pressing roll with a protruding chamfered edge to press on a side of the wear-resistant layer film, allowing the chamfered edge to deform the wear-resistant layer film, the color film and the SPC core layer at a corresponding part of the second sheet to form the chamfer on the plastic floor.

2. The production process of the plastic floor according to claim 1, wherein in the operation 2), the pressing roll includes a protruding dividing edge, the dividing edge divides the second sheet into individual plastic floor sheets while pressing on the wear-resistant layer film.

3. The production process of the plastic floor according to claim 2, further comprising:
   forming a UV layer on the wear-resistant layer film of the plastic floor sheet through UV coating; and
   forming the plastic floor by grooving the SPC core layer of the plastic floor sheet.

4. The production process of the plastic floor according to claim 1, further comprising:
   3) Cutting the second sheet formed in the operation 2) to form individual plastic floor sheets.

* * * * *